Feb. 1, 1944.   T. EARLE   2,340,313
METHOD OF TREATING CEREAL GRAINS
Filed April 15, 1940

Inventor:
THEODORE EARLE
By Howard J. Swet
Attorney

Patented Feb. 1, 1944

2,340,313

UNITED STATES PATENT OFFICE 2,340,313

METHOD OF TREATING CEREAL GRAINS

Theodore Earle, Pacific Palisades, Calif., assignor to Continental Baking Company, Wilmington, Del., a corporation of Delaware Application April 15, 1940, Serial No. 329,725

4 Claims. (Cl. 83—28)

This invention relates to the treatment and surface-conditioning of cereal grains and more particularly to the detachment and removal from husked grains of the outer bran coat lamination normally forming the exterior surface of such grains, and has as an object to provide an improved method for effecting such detachment and removal.

A further object of the invention is to provide an improved method for the surface-conditioning of cereal grains to prepare such grains for milling and food purposes.

A further object of the invention is to provide an improved method for the surface-conditioning of cereal grains which is susceptible of practice to condition such grains for food purposes with a minimum of waste and damage to the grain.

A further object of the invention is to provide an improved method operable to prepare cereal grains for food purposes with a minimum extraction from the grain of the fats, vitamins, and like desirable constituents.

A further object of the invention is to provide an improved conditioning treatment for cereal grains which is susceptible of practice through readily-available equipment, which is rapid and efficient in operation, which is economical in use, productive of desirable conservation of the grain material, and which is readily adaptable to meet the requirements developed as an incident of the treatment and conditioning of specific grains.

My invention consists in the nature, specific character, sequence, and arrangement of operative steps as hereinafter set forth, pointed out in the appended claims and diagrammatically illustrated in the accompanying drawing, in which—

Figure 1:
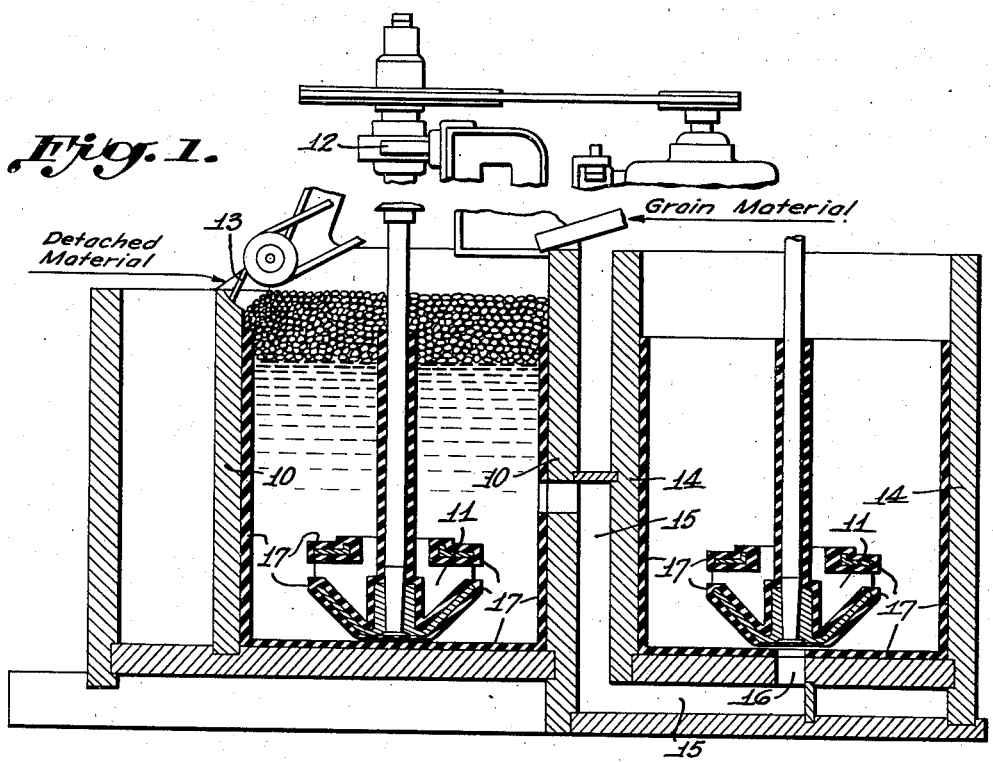
Figure 2:
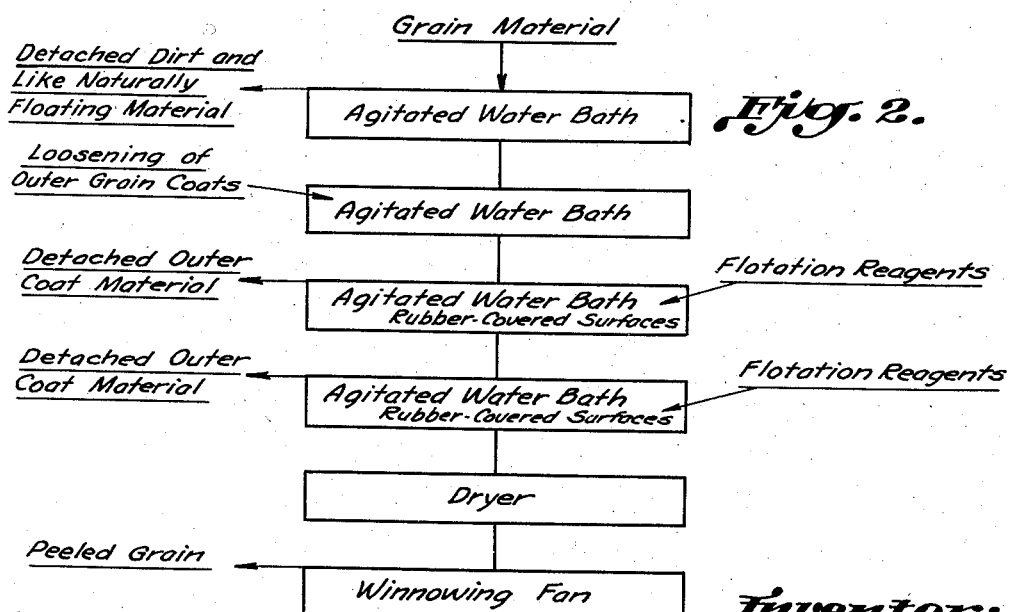

Figure 1 is a vertical section through conventional apparatus suitable for practice of the improved method. Figure 2 is a flow-sheet or diagram illustrating the sequence and nature of the successive steps comprising the improved method.

The cereal grains commonly used for food purposes are in general alike in that the grain berries, after removal of husks, consist of a starchy endosperm wherein is embedded a germ, and an envelope or bran coat surrounding and enclosing the endosperm and germ. The bran coat may consist of a single layer of relatively horny material, as in the case of corn, or may consist of a plurality of separate laminations varying in number and specific character with different grains, husked rice and wheat having bran coats consisting of six distinct laminations. The outer lamination of the bran coat material is, in general, and particularly in the case of rice, oats, rye and wheat, woody in character and entirely unfit for use as food, while certain of the inner bran coat laminations are characterized by valuable food properties.

In preparing cereal grains for use as food it is often desirable to detach and remove one or all of the bran coats, more especially the outer woody bran coat lamination, prior to milling or other treatment of the grain berry, and the methods conventionally employed for total bran coat removal have marked disadvantage in that too great a proportion of the grain berry suitable for food and containing certain desirable food elements is removed, it being customary to remove the entire bran coat, the germ of the berry, and a percentage of the endosperm in order to insure complete removal of the undesirable bran coat material, the loss of grain material through such conventional practice frequently amounting to from twelve per cent to twenty per cent of the original grain weight. Additionally, conventional processes fail to permit of separatory definition between the outer undesirable bran coat lamination and the inner lamination desirable for food purposes, the entire bran coat normally being ground or rubbed off as a unit. The improved method permits of detachment and removal of bran coat laminations progressively and without disturbing the underlying bran coats, endosperm and germ of the berry, thus effecting a marked saving in grain material as well as preserving the food properties heretofore extracted, removal of the undesirable outer bran coat lamination being effected by the improved method with a weight loss of less than two per cent of the original grain weight.

The improved method consists of three distinct phases or steps, irrespective of the particular cereal grain being treated, which phases or steps may, in certain cases, be given effect successively in point of time in a single apparatus unit. The three essential phases or steps of the improved method are—first, a conditioning of the grain berries to loosen and initiate detachment of the outer bran coat lamination; second, detachment and removal of the loosened outer bran coat lamination from the grain berry; third, separation of the detached bran coat material from the cleaned berries.

The first phase or step of the improved method is best accomplished by sustained agitation of the grain material in a bath of suitable liquid, such as water, through a time period sufficient to permit the liquid to soak into, soften and wrinkle the outer bran coat and thereby loosen said bran coat from the underlying berry or bran coat laminations. Best results are had in point of time and uniform conditioning when the grain material is immersed in a volume of liquid sufficient to permit free suspension and circulation of the individual grain berries therethrough, and when the liquid bath and its contents is so agitated, by any suitable or convenient means, as to maintain the grain berries in freely circulating suspension. As will be apparent, various forms and constructions of agitating apparatus suitable to the purpose above described are conveniently available, and it is immaterial to this phase of the method whether the agitation be accomplished by stirrers, impellers, paddles, air or gas jets, or otherwise, so long as the degree of agitation is sufficient to maintain the grain material in freely-circulating suspension in its liquid bath without such violence as would result in breaking or shattering of the grain material.

The second phase of the improved method comprises a treatment which is essentially novel and fundamental to the practical success and efficiency of the detachment and separation sought. This step consists of circulating the conditioned grain material past, against, and in rubbing contact with non-rigid relatively-yieldable surfaces characterized by a high frictional coefficient. It is the function of such circulation of the grain material to rub the grain surface against the relatively-yieldable surfaces for non-abrasive detachment of the loosened bran coat laminations from the grain berries, and it has been determined that an efficient detachment of the character sought can be obtained by covering the interior surfaces of agitating apparatus with a coating of material, such as rubber, having a degree of yieldability such as to recess slightly when a grain berry impinges thereagainst. To avoid damage to the grain berries and to obtain a complete removal of outer bran coat laminations with maximum efficiency, all of the surfaces exposed to contact with the grain berries should be covered alike with the non-abrasive material. The action of the resilient material on the grain surfaces is a very moderate rubbing, the inertia of the grain berry deriving from its circulatory velocity acting to brush the berry into and across the yieldable surface for a progressive peeling of the loosened bran coat lamination, the nature of relatively soft rubber being such as to facilitate this action in that the bran coat tends to stick or adhere slightly to the rubber surface during the momentary contact of the grain berry with such surface. While rubber is mentioned as a material suitable in certain of its forms for lining of the apparatus wherein detachment of the outer bran coat lamination is had, it is to be understood that the reference to rubber is in no sense limitative, but rather typical of any and all suitable materials having the characteristics essential to the function for which the rubber is used in this method. Material having the properties above set forth as essential to successful practice of the improved method may be approximately defined as "adherescent." As will be apparent, the apparatus wherein detachment of the bran coat lamination is effected may be of any specific form, construction, and operative arrangement suitable to accomplish the desired circulation of the grain berries in the manner and for the purpose above set forth, and in many operations it will prove feasible and convenient to accomplish the first two phases of the improved method in the same apparatus, since said method phases alike involve agitation of the grain berries in a body of liquid and naturally follow each other in a closely-related time sequence. It is to be noted that the rubbing action depended upon in the improved method for detachment and removal of the outer bran coat lamination differs from the action had in mills and grinding machines, even when rubber-lined, in that no pressure is exerted against the grain berries other than the very slight pressure deriving from the velocity and inertia of the grain berries moving in and with the agitated liquid.

The third phase of the improved method involves separation of the detached material from the cleaned grain berries, and may be accomplished in any one of various specific manners, the convenience and practicability of the specific separation step to be employed depending, in many cases, on the character of the grain material and the manner in which the outer bran coat lamination detaches from the grain berries. With wheat and rye, for example, the outer bran coat lamination separates from the grain berry in relatively large, thin, flake-like particles, which particles rapidly congest the agitating apparatus, slow down the grain berry circulation therein, and decrease the efficiency of the detachment phase unless promptly removed. In such a case, it is desirable and entirely practical to levitate the detached material away from the grain berries as such detachment occurs, and this may be accomplished by means of froth flotation, use of air or gas jets, upward currents through the liquid body, and the like, all of which is within the present knowledge and teaching of the related art. However, with certain grains, notably brown rice and husked oats, the outer bran coat lamination detaches from the grain berries, when treated as above described, in relatively minute particles, rather than in the flake-like form characteristic of wheat and rye. While these smaller bran coat particles can be removed by the separatory steps above mentioned, they do not so seriously impede operation of the detachment phase and do lend themselves to separation by means of screening, hence the entire contents of the apparatus wherein the detachment phase has been accomplished may be discharged from the apparatus through screens of suitable mesh and the fine bran coat particles washed away from said screens separately from the cleaned grain berries which pass over the screens to further treatment. The size of the particles detached from the rice and oat berries will vary somewhat, but it has been determined that a screen size of some twenty to forty meshes to the inch will serve to pass the bran coat particles with a minimum and unimportant loss of cracked and broken grain material, the exact mesh of the screen being readily determinable for a given grain.

After detachment and separation of the woody bran coat lamination from the grain berries, the cleaned berries may be further treated as may be deemed expedient or desirable to condition the grain material for milling or other preparation as a food product. The remaining bran coat laminations may be detached and removed from the berries, either by further practice of the improved method or through conventional processes and apparatus, the under bran coats carrying sufficient desirable food properties to warrant their salvage and processing separate from the outer woody lamination. The cleaned grain may be polished, particularly in the case of rice, and may be dried by circulating air currents, application of heat, and the like preparatory to immediate milling or storage, as conditions may indicate.

The grain material may be subjected to the essential phases of the improved method in successive, intermittently-treated quantities, as in a batch process, or continuously when a suitable arrangement of apparatus is provided, it being immaterial to the contemplation to the instant invention what specific combination and operative arrangement of apparatus may be employed. Figure 1 of the drawing illustrates a conventional froth flotation unit of a type conveniently available and suitable for practice of the conditioning, detaching, and separating steps of the improved method, this view of the drawing showing, in operative combination, an agitating chamber 10 adapted to contain water for agitation by means of an impeller 11 suitably actuated by means of driving mechanism 12, and means 13 for removing the developed froth and material associated therewith from the upper end of the chamber 10; all surfaces of the apparatus in contact with the water body and grain material fed thereinto being covered by a suitable layer 14 of rubber or equivalent material. The grain cleaned by the improved method has not been subjected to heat or friction, retains the germs and such of the bran coat laminations as may be desired in the finished food product, presents a minimum of cracked and broken grains, is free from dust, and has lost but a relatively small proportion of its original weight through the removal of the woody bran coat lamination. Because of the simplicity and rapidity of the improved method, grain material may be expeditiously treated thereby at remarkably low cost per unit of weight or volume, and the nicety of control over the detachment phase made possible through the improved method is of material advantage in regulating the character and quantity of the bran coat material retained in or on the finished food product.

Figure 2 of the drawing illustrates graphically the sequence of steps to which the grain material is subjected in carrying through the improved method, irrespective of the character and combination of apparatus employed for such purpose. As will be apparent, the first four steps of the method as set forth in the diagram may be accomplished successively in apparatus of the type shown in Figure 1, or said steps may be separately accomplished in various units of apparatus through which the grain material is caused to move progressively.

Numerous practical tests have established the operative efficiency and value of the improved method for the purposes set forth and have fully established the unpalatable and undesirable character of the woody bran coat lamination characteristic of cereal grains, hence pointing the desirability of removing only the outer, undesirable lamination while retaining the other bran coat material on or in available association with the grain berries.

As an example of the practical operation of the improved method, fifteen pounds of brown rice was charged into fifty pounds of water contained in a rubber-lined flotation cell equipped with a rubber-covered impeller and having a capacity of sixty pounds of water. The cell charge was agitated through actuation of the impeller at a peripheral speed of from fourteen hundred to sixteen hundred feet per minute for approximately five minutes, whereafter the entire cell contents was discharged over a thirty mesh screen for separation of the bran from the cleaned rice berries, the cleaned grain being then centrifuged for removal of excess water and finally dried by means of warm air. In this test the bran coat loss amounted to one ounce for every ten pounds of original grain, and the breakage of grains was less than ten per cent and none of the germs are removed from the grains. The cleaned grain berries were of good flavor and highly palatable when prepared as food, and evidenced none of the characteristic disagreeable flavor imparted by the outer bran coat lamination. A comparative test, using a similar quantity of brown rice and a greater quantity of water, was run through apparatus wherein the surfaces exposed to contact with the grain berries were uncovered and all of metal. In the comparative test the berries were rapidly ground down to the starchy endosperm without any possible distinctive separation between bran coat laminations, and the damage to the grain material through cracking and breaking was so great as to render the method impractical. Fully 20% of the grains was so fine it passed through the 30 mesh screen with the bran. It is fully apparent that the characteristic action of yieldable rubber or equivalent material lining the apparatus surfaces exposed to grain contact distinguishes the results obtainable through practice of the improved method from anything resulting from comparable methods wherein such lining characteristic is absent, and that practice of the improved method is productive of new, advantageous, and hitherto unknown results in the cleaning of grain.

Similarly, ten pounds of a hard, red wheat was agitated with fifty pounds of water in the rubber-lined apparatus above set forth with an impeller peripheral speed of approximately eighteen hundred feet per minute for about eight minutes. This impeller speed was adequate to maintain the grain in circulation and suspension within the liquid body. The bran coat material loosened and detached as a result of the agitation was decanted away from the clean berries and amounted to but two per cent, by weight, of the original grain material, there being no apparent loss of endosperm or germ and practically no berry breakage in this application of the improved method. The comparative test operated without the use of the rubber lining material resulted in a detachment and separate removal of outer bran coat material substantially the same in amount as was obtained when the rubber lining was used, but without the rubber lining there was a two and one-half per cent additional weight loss of grain berry material, all of the germs were lost, and about eight per cent breakage of the grain berries. Thus it is clear that the use of the rubber lining effects a two and one-half per cent saving of desirable grain berry material as well as insuring production of a more desirable product through the elimination of breakage and damage to the grain berries.

Analogous comparative tests of the method applied to the debranning of rye show that the use of the rubber lining is effective in grain material saving running as high as twelve per cent as against the same technique employed without the rubber lining.

Husked oats, or oat groats, comparatively treated in the identical manner described for the wheat, showed a bran loss of one and three-tenths per cent, by weight, both with and without the rubber lining, and a loss of berry material amounting to less than one per cent when the rubber lining was used and seven per cent when the test was operated without the rubber lining.

All of these tests clearly show the practical advantage obtainable through the use of rubber lining and a further advantage in the character and quality of the cleaned berry product wherein breakage and damage has been minimized by the use of the resiliently-yieldable material in rubbing contact with the grain berries.

While the improved method has been described in connection with its primary function of removing exterior bran coat laminations from grain berries, it should be obvious that the method is conveniently susceptible of application to the cleaning of grain berry surfaces prior to and separately from removal of the outer bran coat laminations, since by reducing the time of agitation in the rubber-lined apparatus sufficiently to avoid loosening and detachment of the woody bran coat, the grain berries may be adequately surface-rubbed and cleaned by circulation past and against the yieldable surfaces of the apparatus lining.

Since many changes in the specific form and construction of apparatus employed and in the specific relationship, duration, character, and sequence of process steps, may be had without departing from the spirit of my invention, I wish to be understood as being limited solely by the scope of the appended claims, rather than by any details of the foregoing description.

I claim as my invention:

1. The method of stripping non-nutritive, exterior bran coat laminations from cereal grains for the production of peeled grain berries retaining their nutritive bran coat laminations and germ elements in substantially undisturbed, natural relationship, which consists of agitating and freely circulating the grain berries in water to soften and initially loosen their exterior bran coats, sloughing the thus-loosened outer lamination from the berries through repetitious impingement of the berries against, along and into slightly indenting relation with resilient, adherescent surfaces as an incident and under the sole influence of agitation and circulation of said berries in water, and separating the consequently-detached material from the peeled berries.

2. The method of stripping non-nutritive, exterior bran coat laminations from cereal grains without materially disturbing the underlying, nutritive bran coat laminations and the berry germ, which consists of agitating and freely circulating the grain berries in water to soften and initially loosen their exterior bran coat laminations, non-abrasively peeling the thus-loosened material from the berries through repetitious impingement of said berries, under the sole influence of circulatory velocities deriving from agitation of the grain material in and through a body of water, against, along, and into slightly indenting relation with resilient, adherescent surfaces, whereby said surfaces act to frictionally engage relatively large areas of the loosened berry coat material with velocity-retarding effect thereon and consequent sloughing of the engaged outer coat material from its berry, and separating the detached material from the peeled berries.

3. The method of stripping non-nutritive, exterior bran coat material from cereal grains without substantial alteration in the natural conformation of the grain berries and their retained nutritive bran coat laminations and germ elements, which consists of agitating and freely circulating the individual grain berries in water to soften and initially loosen their outer bran coat laminations, subsequently agitating and freely circulating the conditioned individual grain berries in water to repetitious impingement of said berries, under the sole influence of their circulatory velocities, against and along yieldable, adherescent surfaces to that degree productive of slight indentation of the individual berries in such yieldable surfaces for the development of a momentary frictional grip of said adherescent surfaces on the loosened berry material sufficient to slough said loosened material away from its associated berry, and separating the detached material from the peeled berries.

4. The method of stripping previously water-softened, non-nutritive, exterior bran coat laminations from cereal grain berries without substantially altering the conformation and relationship of the remaining berry components, which consists of agitating and freely circulating the conditioned grain berries in water to repetitious impingement of said berries, under the sole influence of their circulatory velocities, against and along yieldable, adherescent surfaces to such degree as will cause said berries to slightly indent said yieldable surfaces for the production of a momentary frictional engagement between said yieldable surfaces and the loosened berry coat material sufficient to overcome the natural bond between the grain berries and their loosened outer coats and thereby non-abrasively peel the loosened material from its associated berry.

THEODORE EARLE.